Aug. 30, 1932.  R. C. BAUCKHAM  1,873,991
TRANSMISSION GEAR SHIFTING MECHANISM
Filed Dec. 12, 1931  3 Sheets-Sheet 1
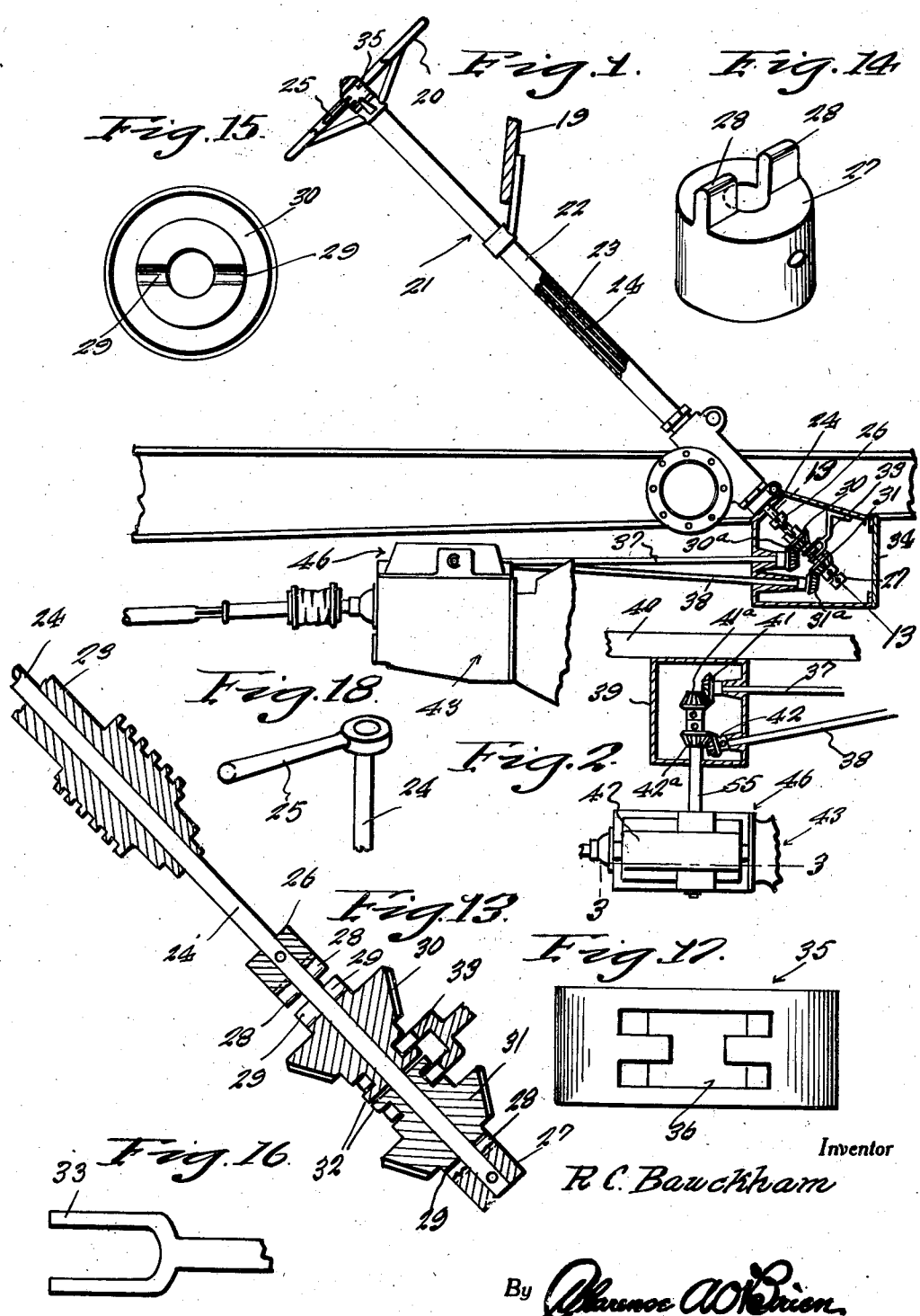
Inventor
R. C. Bauckham

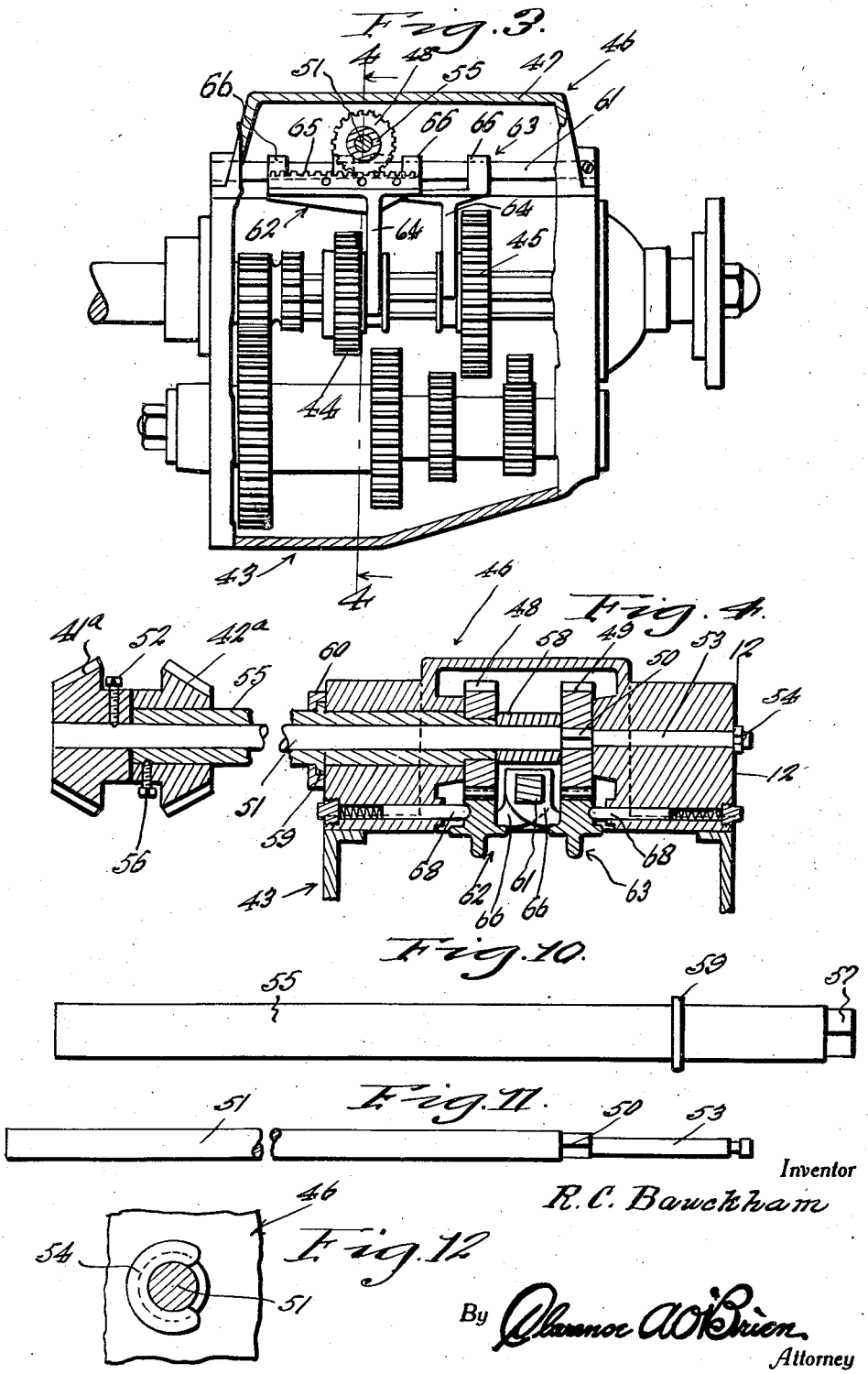

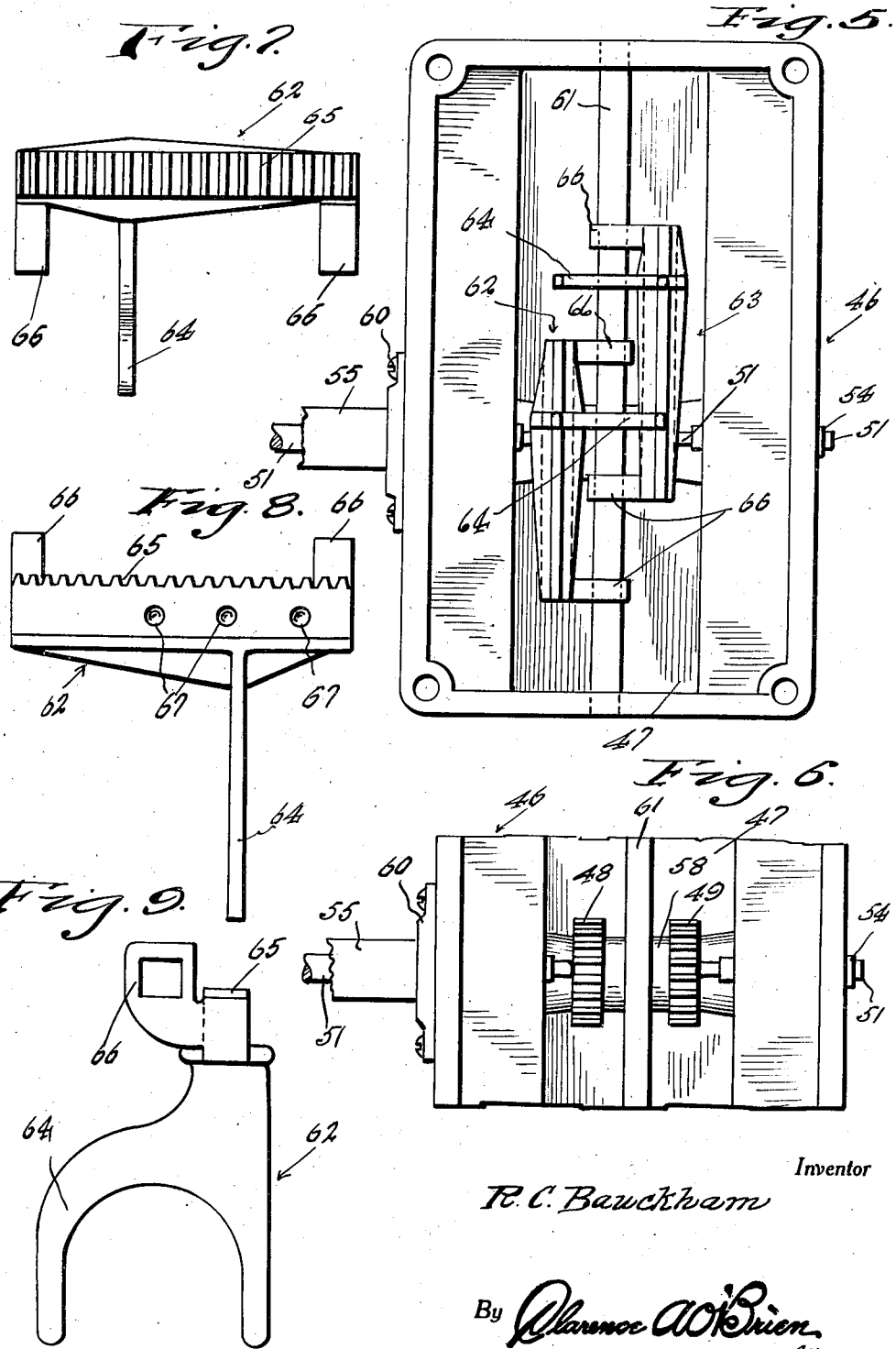

Patented Aug. 30, 1932

1,873,991

UNITED STATES PATENT OFFICE

REMSEN C. BAUCKHAM, OF WOODCLIFF LAKE, NEW JERSEY

TRANSMISSION GEAR SHIFTING MECHANISM

Application filed December 12, 1931. Serial No. 580,697.

This invention relates to a novel remote control mechanism for shifting the speed changing gears of a conventional gear transmission structure such as is used on present date automobiles and the like.

The purpose of the invention is to provide a simple and efficient gear shift arrangement wherein the gears may be controlled from a comparatively short lever mounted on the upper end of the steering column within the vicinity of the usual steering wheel, whereby to provide an improved unique means for shifting gears conveniently and expeditiously so that both hands of the driver may be kept close to the steering wheel for safe driving.

One feature of novelty is predicated on the employment of a short adjustable gear shift lever co-operating with a guide and retention fixture having a conventional H-slot therein so as to permit the lever to be systematically adjusted from neutral to the customary first, second and third positions, as well as from neutral to reverse.

Another feature of the invention is predicated on a novel cover plate for the gear transmission casing wherein said cover plate may be substituted for a conventional cover plate, the substitute cover being provided with positive rack and pinion means to secure the requisite adjustment of the movable gears of the gearing train in said transmission housing or casing.

A further feature is believed to reside in the explicit construction of said transmission cover in that the pinions and supporting shafts are arranged to provide a novel unit susceptible of expeditious application and removal, whereby to facilitate manufacturing and assembling.

A further advantage and feature is found in the use of a lever actuated spindle mounted in the steering column and suitable clutch means, and gear equipped shafting means for insuring positive control of the gear shifting means.

Other structural features and advantages will become more readily apparent from the following description and drawings.

In the drawings:

Figure 1 is a view in elevation and section showing the complete ensemble as developed in accordance with my invention.

Figure 2 is a plan and sectional view showing the preferred arrangement of certain of the bevelled gear assemblies.

Figure 3 is an enlarged vertical section taken approximately on the plane of the line 3—3 of Figure 2.

Figure 4 is a section at right angles to Figure 3, the section being on the plane of the line 4—4 of Figure 3.

Figure 5 is a bottom plan view of the removable head or cover and associated gear shifting rack and pinion means.

Figure 6 is a fragmentary view of the central portion of Figure 5 with the longitudinally adjustable shifter forks removed to disclose the pinion.

Figure 7 is a plan view of one of the shifter forks or units.

Figure 8 is a side view of Figure 7.

Figure 9 is an end view of Figure 8.

Figures 10 and 11 are detail views of the inner and outer pinion and gear shafts carried by the transmission cover.

Figure 12 is a section taken approximately on the plane of the line 12—12 of Figure 4.

Figure 13 is a detail sectional and elevational view of the lower end portion of the reciprocatory and oscillatory lever actuated control spindle.

Figure 14 is a perspective view of a clutch element.

Figure 15 is a plan view of a companion clutch element.

Figure 16 is an elevational view of a supporting yoke.

Figure 17 is a front elevation of the H-slotted lever guide and retaining fixture.

Figure 18 is a fragmentary perspective view of the gear shifting lever and carrying spindle therefor.

In Figure 1, the numeral 19 designates the instrument board, 20 the customary steering wheel, and 21 the steering column as a unit. The column comprises the customary outer casing or post 22, the inside tubular worm shaft 23, and the additional gear shifting spindle 24. The part 24 is a new part and is arranged for rotation within the shaft 23 as shown in detail in Figure 13. On the upper end of the spindle 24 as seen in Figure 13 is the gear shifting lever 25 which is not much longer or larger than an ordinary throttle. Incidently, and owing to the particular ratio of gearing employed in conveying the motion from the lever 23 to the transmission gears, only short movements of the lever 25 become necessary in the gear shifting operation.

As shown in Figure 13, longitudinally spaced collars 26 and 27 are fixedly mounted on the lower end of the spindle 24, and each collar is provided with circumferentially lugs 28 constituting clutch teeth for reception in keeper notches 29 formed on the adjacent complemental beveled gears 30 and 31 respectively. There are two of these gears disposed in reverse order as seen in Figure 13 and the flanged ends 32 are mounted in the arms of a supporting yoke 33, said yoke being fixedly mounted in a protective boxing or housing 34 in the manner shown in Figure 1.

Mounted on the upper end of the steering post is a relatively stationary fixture 35 having an H-shaped slot 36 with which the lever 25 is co-operable. This makes the motion of the lever 25 conventional, it being necessary to place the lever in neutral position and move it through neutral position when shifting from either first, second or third, or to reverse as the case may be.

The spindle 24 is longitudinally slidable and rotatable or oscillatory to permit the shifting of the lever 25. Obviously lifting of the lever 25 and the consequent lift of the spindle 24 engages the collar 27 with the gear 31 to actuate said gear 31. Lowering the spindle 24 allows the clutch collar 26 to engage the companion clutch means on the bevelled gear 30. Thus these two gears 30 and 31 are selectively operable according to the selected position of the gear lever 25 in the slot 36. In practice the slot may be appropriately marked to show the different shifting positions for the lever.

Mounted in bearings in the housing 34 are operating shafts 37 and 38 having bevelled gears 30a and 31a in constant mesh with the bevelled gears 30 and 31. This matched assembly of gearing in the housing 34 is illustrated plainly in Figure 1.

The opposite ends of these shafts 37 and 38 are mounted in bearings in a secondary gearing housing 39 carried by the frame 40 as illustrated in Figure 2, and these ends of the shaft are provided with bevelled gears 41 and 42 which mesh with the bevelled gears 41a and 42a (see Figure 4 also).

The bevelled gears 41a and 42a constitute a part of a highly important member of the complete assembly, the principal parts of said member being illustrated in Figure 4. As shown in the last-named figure and also in Figure 3, the transmission gear casing is denoted by the numeral 43 and the movable gears in this casing are distinguished by the numerals 44 and 45 respectively.

In practice, the customary gear casing head is removed, and the improved head or cover 46 is substituted therefor. This cover is appropriately fashioned to accommodate the parts which it carries to facilitate manufacturing and assembling. For example, the elevated crown portion 47 of the cover is fashioned to accommodate a pair of distinguishable pinions 48 and 49. The pinion 49 is mounted on a polygonal portion 50 of an inner shaft 51. The shaft 51 carries the bevelled gear 41a, said gear being held in place by a set screw 52, and the reduced end portion 53 of this shaft is journalled in a suitable bearing formed in the cover and held in place by a horse-shoe washer 54 as shown in Figures 4 and 12.

The shaft 51 is mounted for rotation in an outer tubular shaft 55 carrying the gear 42a held in place by a set screw 56. This shaft 55 is journalled in a bearing in the cover 46 and the polygonal end portion 57 on which the pinion 48 is keyed. A spacing sleeve 58 surrounds that portion of the shaft 51 between the two pinions, holding them properly in place.

It will also be observed that the shaft 55 has a retaining flange 59 which abuts the cover and is held in place by a removable retaining cap or annulus 60. These two shafts 51 and 55 and the associated pinions and gears constitute a single unit which can be readily assembled and removed from the cover.

The numeral 61 designates a fixedly mounted carrier rod mounted in the cover 46, located between the pinion 48 and 49 and so arranged as to support the individually and selectively slidable gear shifter unit 62 and 63 respectively. These units are sometimes referred to as the shifter forks for the gears 44 and 45, as evidenced from Figure 3. Each unit therefore includes a shifting fork 64 and in accordance with the present invention includes a rack 65 with which the adjacent pinion meshes. In addition, the unit embodies a pair of longitudinally spaced cubical guide eyes 66 slidably mounted on the rod 61.

It is evident from the foregoing arrangement that by actuating the gear shifting lever 25, the spindle 24 is actuated and through the medium of the clutch collars 26 and 27, either one of the bevelled gears 30 or 31 may be operated. Assuming that the gear 30 is brought into play, it is evident that this in turn rotates the shaft 37, the bevelled gears 41 and 41a, the shaft 50, and the pinion 49. This therefore adjusts the adjacent rack of the complemental fork unit, whereby to shift the gears in a predetermined manner.

In practice, the rack bars will be provided with depressions forming sockets 67 for reception of spring pressed retaining pins 68 to hold the gears in set positions in a conventional manner.

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. In a gear shifting arrangement of the class described, in combination, transmission gearing including a casing having conventional gearing mounted therein, said casing being open at its top, a removable cover plate for said open top, a fixedly mounted rod of square cross section supported in said cover, a pair of selectively operable gear shifting devices, each device comprising a fork, a toothed rack, and suspension eyes slidably mounted on the rod, each rack being socketed on one side, spring pressed retention pins in said cover co-operable with the socket for holding the devices in set position, an outer tubular shaft mounted for rotation in a bearing in said cover, a pinion keyed on the inner end of said shaft and co-operable with the adjacent rack, an inner solid shaft mounted for rotation partially in said first-named shaft and partly in a bearing in said cover, a second pinion keyed on said inner shaft and co-operable with the remaining rack, a spacing sleeve surrounding said inner shaft and interposed between said pinion, releasable retaining means for said outer shaft to facilitate assembling of said shafts, beveled turning gears fixedly mounted on the outer ends of both of said shafts, and remote control means for said gears.

2. In a gear shifting arrangement of the class described, in combination, transmission gearing including a casing having conventional gearing mounted therein, said casing being open at its top, a removable cover plate for said open top, a fixedly mounted rod of square cross section supported in said cover, a pair of selectively operable gear shifting devices, each device comprising a fork, a toothed rack, and suspension eyes slidably mounted on the rod, each rack being socketed on one side, spring-pressed retention pins in said cover co-operable with the socket for holding the devices in set position, an outer tubular shaft mounted for rotation in a bearing in said cover, a pinion keyed on the inner end of said shaft and co-operable with the adjacent rack, an inner solid shaft mounted for rotation partially in said first-named shaft and partly in a bearing in said cover, a second pinion keyed on said inner shaft and co-operable with the remaining rack, a spacing sleeve surrounding said inner shaft and interposed between said pinion, releasable retaining means for said outer shaft to facilitate assembling of said shaft, bevelled turning gears fixedly mounted on the outer ends of both of said shafts, and remote control means for said gears, comprising a reciprocatory and oscillatory spindle adapted to be mounted in the steering column, operating connections between the lower end of said spindle and the aforesaid gears, a retaining and guide fixture mounted on the upper end of the steering column and provided with an H-shaped slot, and a gear shifting lever on the upper end of said spindle co-operable with said slot.

3. In a structure of the class described, in combination, a steering post, a steering wheel on the upper end thereof, a rigidly mounted fixture carried by the upper end of the post and provided with an H-shaped slot, a spindle mounted in said post for limited sliding and rotary motion, a gear shifting lever fixedly attached to the upper end of said spindle and projecting into said slots for movement into predetermined portions of the slot in a conventional gear shifting manner, a gear casing disposed adjacent the lower end of the steering column, supporting means in said casing, a pair of bevelled gears arranged in said supporting means, provided with clutch elements, said spindle extending through the hub portions of said gears, and clutch collars fixedly mounted at longitudinally spaced points on said spindle for selective co-action with the clutch elements on said gears to permit either one or the other of the gears to be coupled for rotation with the spindle, together with transmission gear means, shifter forks therefor, a housing for the transmission gear means, a removable cover therefor, a single stationary rod supported in the cover and on which both forks are slidably mounted, each fork having a rack associated therewith, a hollow shaft journalled in the cover, a pinion carried by the hollow shaft and meshing with one of the racks, a shaft passing through the hollow shaft, a pinion thereon meshing with the other rack, gears on the hollow shaft which has a passage therethrough, a pair of shafts having gears on their ends, the gears at one end meshing with the last-mentioned gears, the gears of the other end meshing with the beveled gears in the gear casing.

In testimony whereof I affix my signature.

REMSEN C. BAUCKHAM.